United States Patent
Bilgin et al.

(10) Patent No.: US 12,081,987 B2
(45) Date of Patent: Sep. 3, 2024

(54) IDENTIFYING AND REPORTING A FRAUDULENT BASE STATION

(71) Applicant: Telefonaktiebolaget LM Ericsson (publ), Stockholm (SE)

(72) Inventors: Zeki Bilgin, Istanbul (TR); Emrah Tomur, Izmir (TR); Elif Ustundag Soykan, Istanbul (TR); Mehmet Akif Ersoy, Istanbul (TR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 355 days.

(21) Appl. No.: 17/762,410

(22) PCT Filed: Oct. 25, 2019

(86) PCT No.: PCT/EP2019/079217
§ 371 (c)(1),
(2) Date: Mar. 22, 2022

(87) PCT Pub. No.: WO2021/058120
PCT Pub. Date: Apr. 1, 2021

(65) Prior Publication Data
US 2022/0345892 A1    Oct. 27, 2022

(30) Foreign Application Priority Data

Sep. 24, 2019 (EP) .................................... 19404005

(51) Int. Cl.
*H04W 12/122* (2021.01)
(52) U.S. Cl.
CPC ................................ *H04W 12/122* (2021.01)
(58) Field of Classification Search
CPC .................................................. H04W 12/122
See application file for complete search history.

(56) References Cited

U.S. PATENT DOCUMENTS 9,510,204 B2 * 11/2016 Haro ..................... H04W 4/029
9,628,994 B1    4/2017 Gunyel et al.
(Continued)

FOREIGN PATENT DOCUMENTS

CN    116016769 A  *  4/2023
EP    2661113 A1    11/2013
(Continued)

OTHER PUBLICATIONS

Norrman, Karl, et al., "Protecting IMSI and User Privacy in 5G Networks", In Proceedings of the 9th EAI International Conference on Mobile Multimedia Communications (MobiMedia '16). ICST (Institute for Computer Sciences, Social-Informatics and Telecommunications Engineering), ICST, Brussels, Belgium, 2016, 159-166.

*Primary Examiner* — Adam D Houston
(74) *Attorney, Agent, or Firm* — Murphy, Bilak & Homiller, PLLC

(57) ABSTRACT

There is provided mechanisms for identifying a fraudulent base station. A system comprises an analyser device and at least two radio devices. The system is configured to provide a report, from any of the at least two radio devices and to the analyser device upon that any of the at least two radio devices having received from a base station an identity request message for a long-term identifier of that any of the at least two radio devices, of the identity request message. The system is configured to identify, by the analyser device, the base station as fraudulent when reports of the same base station as received from at least two different ones of the at least two radio devices are received within a threshold time duration with respect to each other.

22 Claims, 8 Drawing Sheets

(56) References Cited

U.S. PATENT DOCUMENTS

| | | | | |
|---|---|---|---|---|
| 9,633,201 | B1* | 4/2017 | Katz | G06Q 40/02 |
| 9,838,879 | B2* | 12/2017 | Norrman | H04W 24/08 |
| 10,949,850 | B1* | 3/2021 | Velline | G06Q 20/405 |
| 11,405,406 | B2* | 8/2022 | Gotoh | H04L 63/1425 |
| 11,463,475 | B1* | 10/2022 | Colon | H04M 3/42195 |
| 11,847,572 | B2* | 12/2023 | Zhao | G06F 18/2148 |
| 2006/0285665 | A1* | 12/2006 | Wasserblat | G06Q 20/4016 |
| | | | | 704/E17.002 |
| 2008/0010678 | A1* | 1/2008 | Burdette | G06Q 30/0603 |
| | | | | 726/15 |
| 2009/0234760 | A1* | 9/2009 | Walter | G06Q 40/12 |
| | | | | 705/30 |
| 2012/0310743 | A1* | 12/2012 | Johri | G06Q 20/352 |
| | | | | 705/14.58 |
| 2013/0344844 | A1 | 12/2013 | Goldfarb | |
| 2014/0058854 | A1* | 2/2014 | Ranganath | G06Q 20/405 |
| | | | | 705/16 |
| 2015/0348042 | A1* | 12/2015 | Jivraj | G06Q 20/326 |
| | | | | 705/44 |
| 2016/0297401 | A1* | 10/2016 | Haga | H04L 9/0891 |
| 2016/0381545 | A1* | 12/2016 | Wang | H04W 12/128 |
| | | | | 455/434 |
| 2018/0048663 | A1* | 2/2018 | Yura | H04L 12/40 |
| 2018/0097807 | A1* | 4/2018 | Hahn | H04W 12/06 |
| 2018/0302794 | A1* | 10/2018 | Liu | H04W 12/122 |
| 2018/0367978 | A1* | 12/2018 | Targali | H04L 63/0823 |
| 2019/0059032 | A1* | 2/2019 | Han | H04W 36/36 |
| 2019/0132740 | A1* | 5/2019 | De | H04W 12/122 |
| 2019/0349394 | A1* | 11/2019 | Kishikawa | H04L 12/28 |
| 2019/0373473 | A1* | 12/2019 | Kemppainen | H04W 12/12 |
| 2021/0160276 | A1* | 5/2021 | Broadworth | H04L 63/1416 |
| 2021/0227408 | A1* | 7/2021 | Takiguchi | H04W 68/005 |
| 2022/0345892 | A1* | 10/2022 | Bilgin | H04W 12/122 |
| 2023/0120157 | A1* | 4/2023 | Scholer | H04M 15/58 |
| | | | | 455/405 |
| 2023/0217272 | A1* | 7/2023 | Simms | H04L 41/0654 |
| | | | | 455/224 |

FOREIGN PATENT DOCUMENTS

| | | | | |
|---|---|---|---|---|
| EP | 3817351 A1 | * | 5/2021 | H04M 3/436 |
| EP | 3488577 B1 | * | 9/2021 | H04L 63/14 |
| ES | 2712700 T3 | * | 5/2019 | H04L 63/1441 |
| JP | 2008533921 A | | 8/2008 | |
| JP | 2014527762 A | | 10/2014 | |
| JP | 2024005967 A | * | 1/2024 | H04L 63/1416 |
| WO | 2016206610 A1 | | 12/2016 | |
| WO | WO-2018014937 A1 | * | 1/2018 | H04L 63/14 |
| WO | WO-2021058120 A1 | * | 4/2021 | H04W 12/122 |
| WO | WO-2022233443 A1 | * | 11/2022 | H04W 12/122 |
| WO | WO-2023151399 A1 | * | 8/2023 | |
| WO | WO-2024032935 A1 | * | 2/2024 | |

* cited by examiner

IDENTIFYING AND REPORTING A FRAUDULENT BASE STATION

TECHNICAL FIELD

Embodiments presented herein relate to methods, a system, an analyser device, a computer program, and a computer program product for identifying a fraudulent base station. Embodiments presented herein further relate to a method, a radio device, a computer program, and a computer program product for reporting a fraudulent base station.

BACKGROUND

Cellular telecommunication systems (2G systems, 3G systems, 4G systems, and 5G systems) are inherently built of a structure of interconnected cells, where a cell in this concept represents a coverage region served by a base station emitting wireless radio signals. Typically, base stations are equipped with powerful RF (Radio Frequency) transceivers and antennas in order to serve its coverage region. Cellular telecommunication systems are sometimes also referred as mobile communication systems (or networks), cellular (or wireless) communications networks, cellular radio systems or cellular networks. In these systems, several services might be offered, such as wireless Internet access, voice call service, short messaging services, and data sharing between users. Here, each user is represented by its a user equipment (UE) to access cellular telecommunication system.

Base stations are referred with various terms in different generations of cellular telecommunication systems. For example, they are termed as base transceiver station (BTS) in 2G systems, NodeB in 3G systems, eNodeB in 4G systems and gNodeB in 5G systems. Base stations emit radio signals structured according to related international standards. These signals include, for example, information about the base station itself, such as physical cell ID, signal frequency, and synchronization information. Each UE extracts this information from the received signals and calculate various parameter values, such as RSRP (Reference Signal Received Power). RSRP depends on several factors, for example the radiating power of the base station, the receiver sensitivity at the UE, and the location at which the measurements are made. A UE might sense RF signals simultaneously belonging to different base stations and select the one which is believed to best serve the UE based on some standard criteria. One criteria in this regard is the RSRP, since UEs tend to attach a base station resulting in highest possible RSSP. This base station is generally the one physically closest to the UE.

Each UE is associated with a subscriber, needed for the UE to gain access to the cellular telecommunication system via the base station. Subscribers in the cellular telecommunication systems have a long-term identifier, denoted International Mobile Subscriber Identifier (IMSI), which for example could be embedded in a Universal Subscriber Identity Module (USIM). This is a unique identifier assigned to the subscriber, and should therefore be handled with care in network protocols and applications for security and privacy reasons. When a subscriber attempts to join the network by connecting to a base station via the UE, an attach procedure is performed. The attach procedure requires disclosure over a radio link of the identity of the UE. At this step, a short-term identifier, denoted Temporary Mobile Subscriber Identity (TMSI), is used rather than IMSI to ensure privacy of the subscriber. TMSIs are generated by the core network and kept in a database, the Visitor Location Register (VLR), which relates TMSIs and corresponding IMSIs. The TMSI is updated regularly depending on the physical location of the UE.

During the attach procedure in 4G systems (and in earlier generation systems), the UE is requested to identify itself by the mobility management entity (MME), or similar, through the base station the UE is attempting to connect to. The UE commonly respond to this request by declaring its TMSI. Yet, related standards allow base stations to request the long-term identifier, the IMSI, instead of the TMSI, by sending a special IDENTITY REQUEST message, as a mechanism to resolve cases where TMSIs are lost or unreachable in the network. This mechanism might be exploited by malicious unauthorized base stations, hereinafter denoted a fraudulent base station, to capture the IMSI of the UE by transmitting IDENTITY REQUEST messages. To do so, the fraudulent base station might advertise itself as a preferred service point for the UE by radiating more powerful signals than other base station.

Fraudulent base stations as referred to in the present disclosure are sometimes referred to with different terms, such as fake base stations, IMSI catchers, stingrays, rogue base stations, false base stations, and the like. In the present disclosure the term fraudulent base station is used to denote a base station set up with the aim to capture the long-term identifier (such as the IMSI) of subscribers of UEs in a cellular telecommunication system.

In some cases, a fraudulent base station might achieve its goal by exploiting the procedures of Tracking Area Update (TAU), as used in 4G systems, and Location Area Update (LAU), as used in 3G systems, in such a way that the fraudulent base station advertise itself with a different Tracking Area Identity or Location Area Identity from legitimate base stations, and thereby convince the UE receiving signals from the fraudulent base station to initiate a TAU or LAU procedure that involves an attach procedure. Because there is no required security mechanism by design for mutual authentication between a UE and a base station during the initial phase of the attach procedure, a fraudulent base station might thereby obtain the IMSI of the UE. Legal measures might not be sufficient to preventing this kind of misuse of base stations. Hence, it might also necessary be necessary to take some technical countermeasures.

Earlier approaches proposed for detection of fraudulent base stations can be categorized into two groups: (i) Device-assisted mechanisms, and (ii) Network-assisted mechanisms. As an example of the first category, a technician might manually observe the radio signals received at a specific location by using a radio device or spectrum analyzer to see if there is any suspicious signal that could be a sign for a possible fraudulent base station. As another example of the first category, a special kind of terminal is configured to send a Location Area Update Request message to a targeted base station, and then if a REJECT message is received from this base station in return, it is identified as a fraudulent base station. As an example of the second category, regular measurement reports of all UEs in a region of interest are first collected by the base stations and forwarded to a central unit for further processing. Then, anomaly detection is performed at the central unit by analyzing the collected measurement reports whilst comparing to the network topology of all legitimate base stations.

The above earlier approaches in the first category could be cumbersome to implement and the above earlier approaches in the second category could have high computational requirements. Hence, there is still a need for improved detection of fraudulent base stations.

SUMMARY

An object of embodiments herein is to provide efficient identification and reporting of fraudulent base stations not suffering from the issues noted above, or at least where the above issues are mitigated or reduced.

According to a first aspect there is presented a system for identifying a fraudulent base station. The system comprises an analyser device and at least two radio devices. The system is configured to provide a report, from any of the at least two radio devices and to the analyser device upon that any of the at least two radio devices having received from a base station an identity request message for a long-term identifier of that any of the at least two radio devices, of the identity request message. The system is configured to identify, by the analyser device, the base station as fraudulent when reports of the same base station as received from at least two different ones of the at least two radio devices are received within a threshold time duration with respect to each other.

According to a second aspect there is presented a method for identifying a fraudulent base station. The method is performed by an analyser device. The method comprises receiving a report, from any of at least two radio devices upon that any of the at least two radio devices having received from a base station an identity request message for a long-term identifier of that any of the at least two radio devices, of the identity request message. The method comprises identifying the base station as fraudulent when reports of the same base station as received from two different ones of the at least two radio devices are received within a threshold time duration with respect to each other.

According to a third aspect there is presented an analyser device for identifying a fraudulent base station. The analyser device comprises processing circuitry. The processing circuitry is configured to cause the analyser device to receive a report, from any of at least two radio devices upon that any of the at least two radio devices having received from a base station an identity request message for a long-term identifier of that any of the at least two radio devices, of the identity request message. The processing circuitry is configured to cause the analyser device to identify the base station as fraudulent when reports of the same base station as received from two different ones of the at least two radio devices are received within a threshold time duration with respect to each other.

According to a fourth aspect there is presented an analyser device for identifying a fraudulent base station. The analyser device comprises a receive module configured to receive a report, from any of at least two radio devices upon that any of the at least two radio devices having received from a base station an identity request message for a long-term identifier of that any of the at least two radio devices, of the identity request message. The analyser device comprises an identify module configured to identify the base station as fraudulent when reports of the same base station as received from two different ones of the at least two radio devices are received within a threshold time duration with respect to each other.

According to a fifth aspect there is presented a computer program for identifying a fraudulent base station. The computer program comprises computer program code which, when run on processing circuitry of an analyser device, causes the analyser device to perform a method according to the second aspect.

According to a sixth aspect there is presented a method for reporting a fraudulent base station. The method is performed by a radio device. The method comprises receiving, from a base station, an identity request message for a long-term identifier of the radio device. The method comprises providing a report of the identity request message to an analyser device upon the radio device having received the identity request message.

According to a seventh aspect there is presented a radio device for reporting a fraudulent base station. The radio device comprises processing circuitry. The processing circuitry is configured to cause the radio device to receive, from a base station, an identity request message for a long-term identifier of the radio device. The processing circuitry is configured to cause the radio device to provide a report of the identity request message to an analyser device upon the radio device having received the identity request message.

According to an eight aspect there is presented a radio device for reporting a fraudulent base station. The radio device comprises a receive module configured to receive, from a base station, an identity request message for a long-term identifier of the radio device. The radio device comprises a provide module configured to provide a report of the identity request message to an analyser device upon the radio device having received the identity request message.

According to a ninth aspect there is presented a computer program for reporting a fraudulent base station. The computer program comprising computer program code which, when run on processing circuitry of a radio device, causes the radio device to perform a method according to the sixth aspect.

According to a tenth aspect there is presented a computer program product comprising a computer program according to at least one of the fifth aspect and the ninth aspect and a computer readable storage medium on which the computer program is stored. The computer readable storage medium could be a non-transitory computer readable storage medium.

Advantageously these methods, this system, these analyser devices, these radio devices, these computer programs, and this computer program product provide efficient identification and reporting of fraudulent base stations.

Advantageously these methods, this system, these analyser devices, these radio devices, these computer programs, and this computer program product do not suffer from the issues noted above.

Advantageously these methods, this system, these analyser devices, these radio devices, these computer programs, and this computer program product are easy to implement and do not have high computational requirements.

Advantageously these methods, this system, these analyser devices, these radio devices, these computer programs, and this computer program product enable instantaneous detection of fraudulent base stations without requiring any prior preparations, such as data collection related to legitimate network or region to be scanned.

Advantageously these methods, this system, these analyser devices, these radio devices, these computer programs, and this computer program product do not require any change at the network level or protocols used.

Advantageously these methods, this system, these analyser devices, these radio devices, these computer programs, and this computer program product enable false alarms to be decreased and the detection accuracy to be increased compared to training-based mechanisms for detecting fraudulent base stations.

Advantageously these methods, this system, these analyser devices, these radio devices, these computer programs, and this computer program product do not require any private information about the network or about the end-users, thus eliminating the risk of privacy issue to occur.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
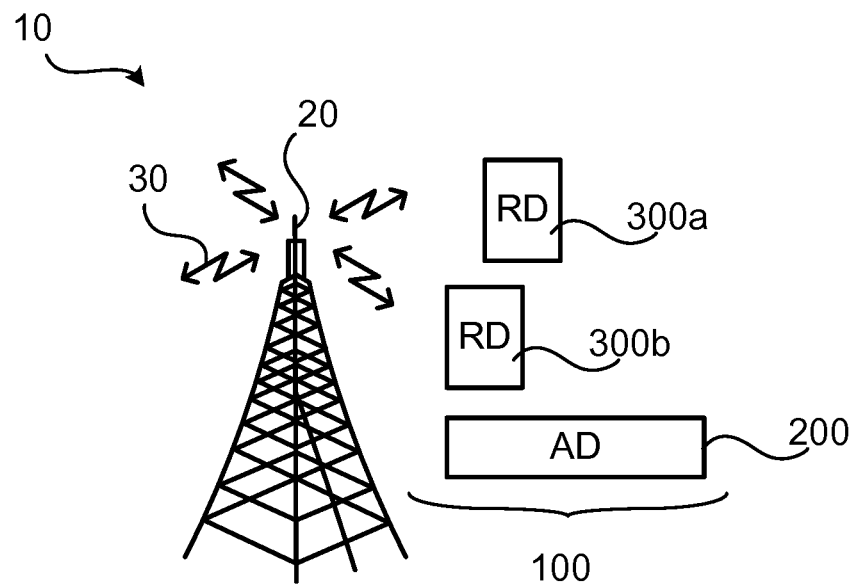
FIG. 1 is a schematic diagram illustrating a cellular telecommunication system according to embodiments.

FIG. 1 is a schematic diagram illustrating a simplification of a cellular telecommunication system 10 where embodiments presented herein can be applied. The cellular telecommunication system 10 comprises a base station 20, assumed to be a fraudulent base station. The fraudulent base station 20 transmit radio signals, as indicated by radiating arrows 30. It is assumed that the radio signals are received by radio devices (RD) 300a, 300b. As will be disclosed in more detail below, the radio devices 300a, 300b provide reports to an analyser device (AD) 200 configured to identify the base station as fraudulent. The analyser device 200 and at least two radio devices 300a, 300b together constitute a system 100.

The embodiments disclosed herein in particular relate to mechanisms for identifying a fraudulent base station 20 and reporting a fraudulent base station 20. In order to obtain such mechanisms there is provided an analyser device 200, a method performed by the analyser device 200, a computer program product comprising code, for example in the form of a computer program, that when run on processing circuitry of the analyser device 200, causes the analyser device 200 to perform the method. In order to obtain such mechanisms there is further provided a radio device 300a:300N, a method performed by the radio device 300a:300N, and a computer program product comprising code, for example in the form of a computer program, that when run on processing circuitry of the radio device 300a:300N, causes the radio device 300a:300N to perform the method. In order to obtain such mechanisms there is further provided a system comprising the analyser device 200 and at least two radio devices 300a:300N.

There could be different systems 100. Two non-limiting examples thereof will now be disclosed with reference to FIG. 2 and FIG. 3.

Figure 2:
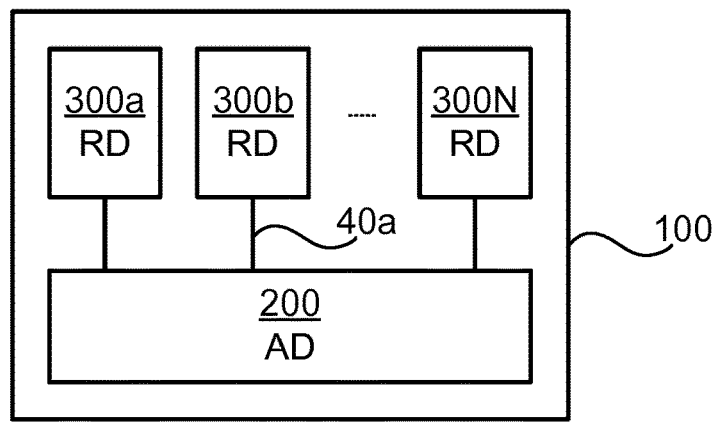
FIGS. 2 and 3 are schematic illustrations of a system according to embodiments.

FIG. 2 illustrates a system 100 according to a first embodiment. In the embodiment of FIG. 2, each of the at least two radio devices 300a:300N is operatively connected to the analyser device 200 over a wired connection 40a. As the skilled person, there could be different types of wired connections, such as optical fiber connections, coaxial cable connections, twisted pair cable connections, and the like. In the embodiment of FIG. 2, the analyser device 200 and the at least two radio devices 300a:300N are integrated, collocated, or provided, within one and the same physical entity, where this physical entity defines the system 100. The system 100 of FIG. 2 might be stationary and fixed to a critical location to enable continuous monitoring of any fraudulent base stations at such a critical location. Hence, according to an example, the system 100 is configured to be mounted on a fixed location. The system 100 of FIG. 2 might alternatively be mounted on a vehicle (e.g. car, unmanned aerial vehicle (UAV), or the like) to enable intermittently monitoring of different locations. Hence, according to an example, the system 100 is configured to be movable. In this sense, more than one such system 100 might be deployed to monitor different regions and configured to issue notifications of base stations deemed fraudulent.

Figure 3:
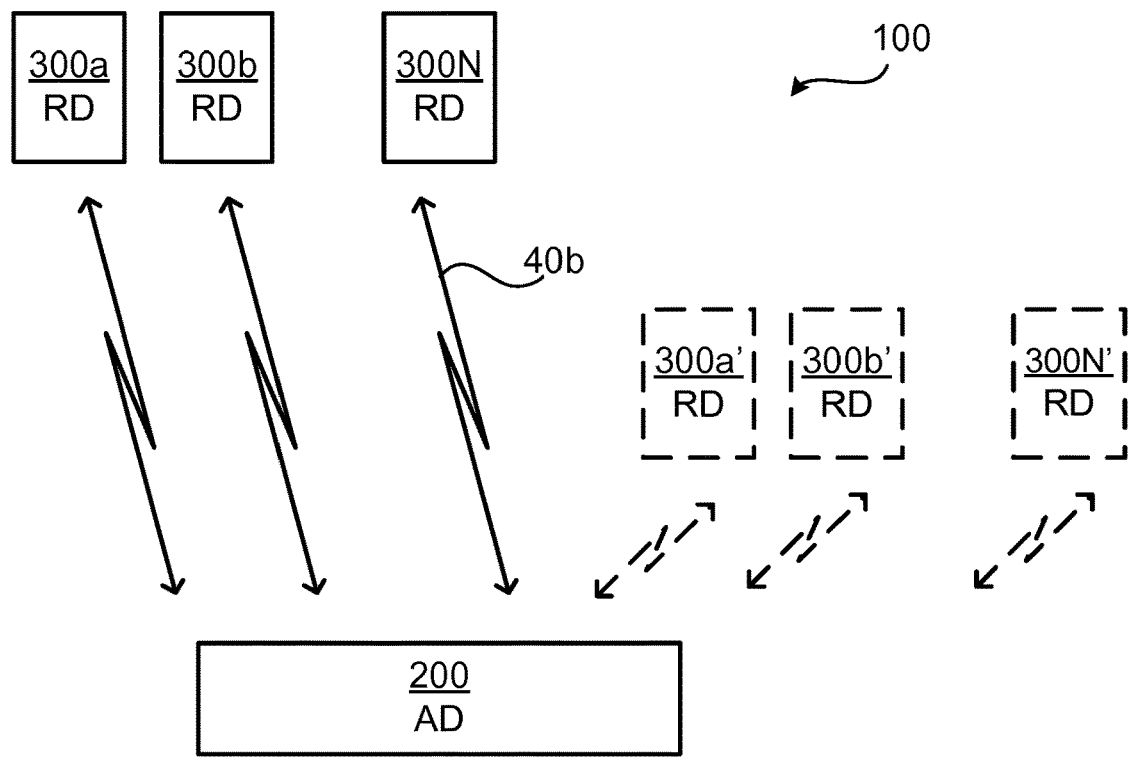

FIG. 3 illustrates a system 100 according to a second embodiment. In the embodiment of FIG. 3, each of the at least two radio devices 300a:300N is operatively connected to the analyser device 200 over a wireless connection 40b. In FIG. 3 is also illustrated further, optional, at least two radio devices 300a':300N', each of which is operatively connected to the analyser device 200 over a respective wireless connection. As the skilled person, there could be different types of wireless connections, such as wireless connections using radio signalling, wireless connections using infrared signalling, and the like. The analyser device 200 of the system 100 in FIG. 3 might reside in a cloud computational environment. The system 100 of FIG. 3 is by definition considered to be movable by the virtue of the at least two radio devices 300a:300N being movable.

Figure 4:
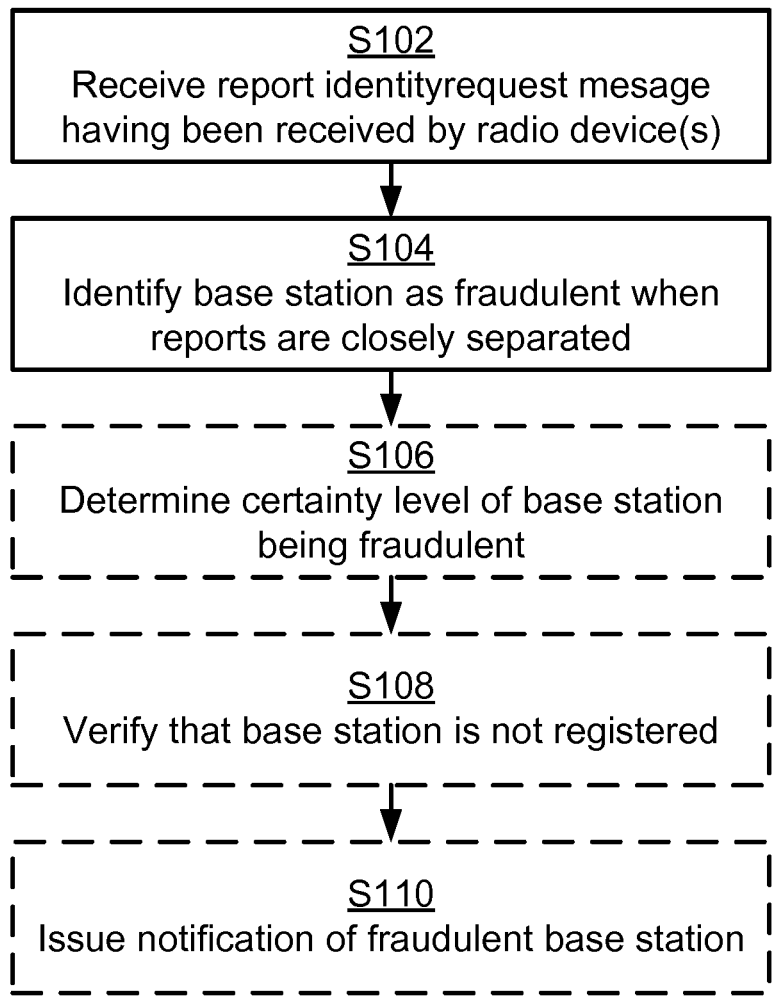
FIGS. 4, 5, 6, and 7 are flowcharts of methods according to embodiments.

In some embodiments, such as in the first and second embodiments above, it is assumed that the at least two radio devices 300a:300N are positioned relative each other to receive signals from the same base station. In the example of FIG. 2, radio devices 300a:300N form a first group of radio devices positioned relative each other to receive signals from one and the same base station and optional radio devices 300a':300N' form a second group of radio devices positioned relative each other to receive signals from one and the same base station Reference is now made to FIG. 4 illustrating a method for identifying a fraudulent base station 20 as performed by the analyser device 200 according to an embodiment.

As will be further disclosed below, each of the radio devices 300a:300N is configured to report any received identity request messages to the analyser device 200. Hence, the analyser device 200 is configured to perform S102:

S102: The analyser device 200 receives a report. The report is received from any of at least two radio devices 300a:300N upon that any of the at least two radio devices 300a:300N having received from a base station 20 an identity request message for a long-term identifier of that any of the at least two radio devices 300a:300N. The report is of the identity request message.

The base station 20 is identified as fraudulent based on the time difference between the reports. In particular, the analyser device 200 is configured to perform S104: S104: The analyser device 200 identifies the base station 20 as fraudulent when reports of the same base station 20 as received from two different ones of the at least two radio devices 300a:300N are received within a threshold time duration with respect to each other.

In this respect, from real network statistics follows that it is very unlikely that two or more radio devices 300a:300N in proximity of each other receive simultaneously, or within very short period of time as defined by the threshold time duration, receive an identity request message. This is because of the fact that an identity request message is by a legitimate base station only sent to request the long-term identifier from a UE under some exceptional circumstances, such as at initial registration to network, when the long-term identifier is lost in the core network, or upon authentication failure between UEs and the base station. This fact is exploited by the herein disclosed embodiments. Hence, by means of the radio devices 300a:300N the radio environment can be efficiently (either continuously or intermittently) scanned for potential fraudulent base stations, enabling real-time detection and identification of any fraudulent base station.

Embodiments relating to further details of identifying a fraudulent base station 20 as performed by the analyser device 200 will now be disclosed.

In some aspects, the analyser 200 issues a notification when the base station 20 has been identified as fraudulent. In particular, in some embodiments the analyser device 200 is configured to perform (optional) step S110:

S110: The analyser device 200 issues a notification of the thus identified fraudulent base station 20.

There could be different types of notification issued by the analyser device 200 in S110. For example, the notification might be an alert message. There could be different types of recipients of the notification. For example, the notification might by the analyser device 200 be sent to a network management entity. Thereby, when a fraudulent base station has been identified in S104, a notification in the form of an alert message might be sent by the analyzer device 200 to a network management entity for further handling of the fraudulent base station.

In some aspects, the analyser device 200 only issues the notification in S110 only if one or more conditions is satisfied. Examples of such conditions will be disclosed next.

One first condition relates to from how many radio devices 300a:300N reports have been received within the threshold time duration. That is, in some embodiments, the notification is in S110 only issued when the analyser device 200 has, for one and the same base station 20, received reports separated from each other at most by the threshold time duration from at least k radio devices 300a:300N, where k>1 is an integer. The higher the value of k, the higher the level of confidence that the base station 20 indeed is fraudulent.

A certainty level can thereby be developed based on how many radio devices 300a:300N are reporting identity request message for a long-term identifier at the same time, or within a time interval given by the threshold time duration. Alternatively, assuming that there are N radio devices in total that are configured to provide reports to the analyser device 200, the notification might be issued when k devices out of N receive the same identity request message for a long-term identifier at the same time from the same cell.

One second condition relates to a certainty level for identifying the base station 20 indeed as fraudulent. That is, in some embodiments the analyser device 200 is configured to perform (optional) step S106:

S106: The analyser device 200 determines a certainty level based on how many reports separated from each other at most by the threshold time duration have been received and how many at least two radio devices 300a:300N are operatively connected to the analyser device 200.

The notification might then in S110 only be issued when the certainty level is above a certainty threshold value.

One third condition relates to network statistics. In particular, in some embodiments, the certainty level further is based on network statistics obtained by the analyser device 200.

One fourth condition relates to verification performed by the analyser device 200. In general terms, a fraudulent base station will send identity request messages for the long-term identifier of the radio devices 300a:300N much more often than a legitimate base station, regardless of if the radio devices 300a:300N have valid long-term identifiers or not. According to real network statistics, for a legitimate base station, an identity request message for a long-term identifier could amount to less than 15% with respect to all identity request messages sent; for the remaining more than 85% the identity request message is for a short-term identifier. In particular, in some embodiments the analyser device 200 is configured to perform (optional) step S108: S108: The analyser device 200 verifies, by querying a database and before the notification is issued, that the base station 20 is not a registered base station.

When S108 is performed, S108 is performed before S110 is performed.

The analyser device 200 might thus be configured to perform analyses on reports, if any, received from the radio devices 300a:300N and therefrom determine if there is any base station that should be considered as fraudulent based on the number of reports, content of the reports, and timestamps of the reports.

The herein disclosed system 100 is flexible in the sense that parameters relating to any of the above four conditions might be set with regards to the sensitivity of the detection, for example by changing the value of the threshold time duration and also by adjusting from how many radio devices 300a:300N reports need to be received for a notification to be issued.

Aspects of the report received from one or more of the radio devices 300a:300N will now be disclosed. In some examples the at least one radio device 300a:300N reports Cell ID, an identifier which unambiguously identifies a cell within a public land mobile network (PLMN). That is, in some embodiments, the report comprises a Cell ID of the base station 20 having sent the identity request message.

There could be different examples of the long-term identifier. According to some embodiments, the long-term identifier is the IMSI.

In some aspects, one or more of the at least two radio devices 300a:300N is/are configured to be served by two or more mobile network operators.

Particularly, in some embodiments, the at least two radio devices 300a:300N collectively are configured to be served by at least two different mobile network operators. Thereby, one and the same system 100 might be used to identify fraudulent base stations for two or more mobile network operators, which in turn might lower costs and overall power consumption to detect fraudulent base stations in a specific region for all the mobile network operators.

However, this does not necessarily imply that signals from base stations operated by two or more mobile network operators are simultaneously collected and analysed.

Aspects of when the identity request message is transmitted by the base station 200 and thus received by the at least two radio devices 300a:300N will now be disclosed. According to a first example, the identity request message is received during an attach procedure, a TAU procedure, or a LAU procedure. According to a second example, the identity request message is received without said any of the at least two radio devices 300a:300N having experienced network lock out. According to a third example, the identity request message is received upon said any of the at least two radio devices 300a:300N already having performed initial registration since its radio modem lastly was switched on.

Figure 5:
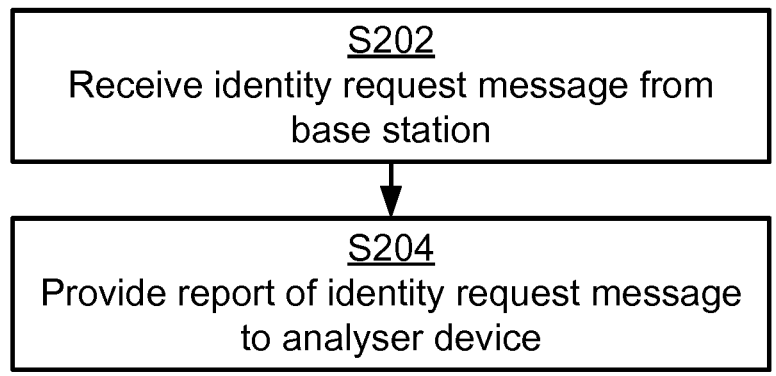

Reference is now made to FIG. 5 illustrating a method for reporting a fraudulent base station 20 as performed by the radio device 300a:300N according to an embodiment.

The radio device 300a:300N is configured to receive messages from base stations. In particular, the radio device 300a:300N is configured to perform S202: S202: The radio device 300a:300N receives, from a base station 20, an identity request message for a long-term identifier of the radio device 300a:300N.

The radio device 300a:300N then reports this identity request message to the analyser device. That is, the radio device 300a:300N is configured to perform S204: S204: The radio device 300a:300N provides a report of the identity request message to an analyser device 200 upon the radio device 300a:300N having received the identity request message.

Embodiments relating to further details of reporting a fraudulent base station 20 as performed by the radio device 300a:300N will now be disclosed.

In general terms, the radio device 300a:300N is registered to the network as an ordinary UE.

As above, in some embodiments, the report comprises a Cell ID of the base station 20 having sent the identity request message.

As above, in some embodiments, the long-term identifier is the IMSI.

As above, according to a first example, the identity request message is by the radio device 300a:300N received during an attach procedure, a TAU procedure, or a LAU procedure. As above, according to a second example, the identity request message is received without the radio device 300a:300N having experienced network lock out. As above, according to a third example, the identity request message is received upon the radio device 300a:300N already having performed initial registration since its radio modem lastly was switched on.

Figure 6:
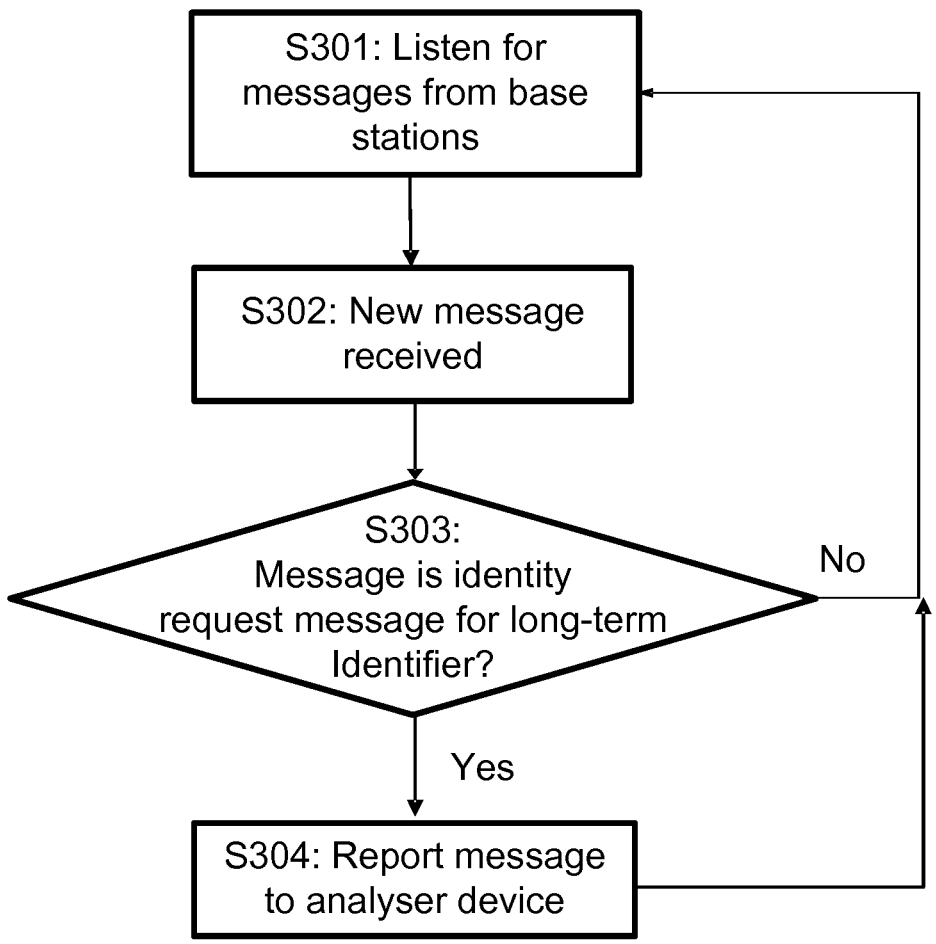

Reference is made to the flowchart of FIG. 6 illustrating a method for reporting a fraudulent base station 20 as performed by the radio device 300a:300N based on at least some of the above embodiments.

S301: The radio device 300a:300N listens for any messages as transmitted from base stations.

S302: The radio device 300a:300N receives a message from one of the base stations.

S303: The radio device 300a:300N checks if the message is an identity request message for a long-term identifier. If yes, then step S304 is entered, and if no, then step S301 is entered.

S304: The radio device 300a:300N reports the message to the analyser device 200.

Figure 7:
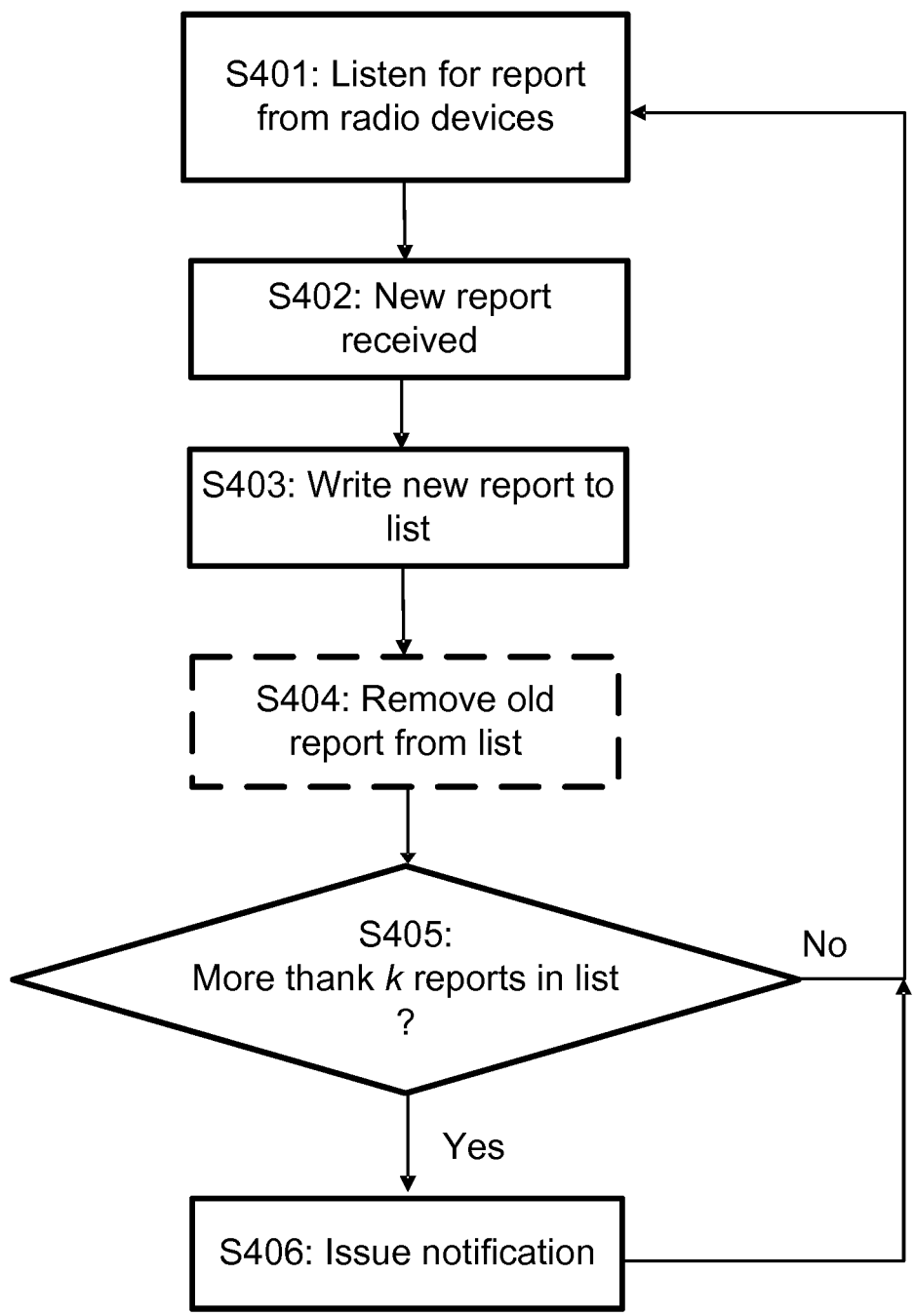

Reference is made to FIG. 7 illustrating a method for identifying a fraudulent base station 20 as performed by the analyser device 200 based on at least some of the above embodiments.

S401: The analyser device 200 listens for any reports of identity request messages for a long-term identifier having being received by any of the radio devices 300a:300N.

S402: The analyser device 200 receives, from one of the radio devices 300a:300N, a report of an identity request message for a long-term identifier having been received by this one of the radio devices 300a:300N.

S403: The analyser device 200 writes the received report and a timestamp indicating when in time the report was received to a list. Alternatively, the timestamp indicates when in time the identity request message was received by the related radio device 300a:300N.

S404: The analyser device 200 removes from the list any report with timestamp older than a threshold time value. The analyser device 200 also removes from the list any previous report of the same base station from the same radio device 300a:300N even if this previous report is not older than the threshold time value.

S405: The analyser device 200 checks if there are more than k reports in the list. If yes, then step S406 is entered, and if no, then step S401 is entered.

S406: The analyser device 200 issues a notification of a fraudulent base station having been identified.

Figure 8:
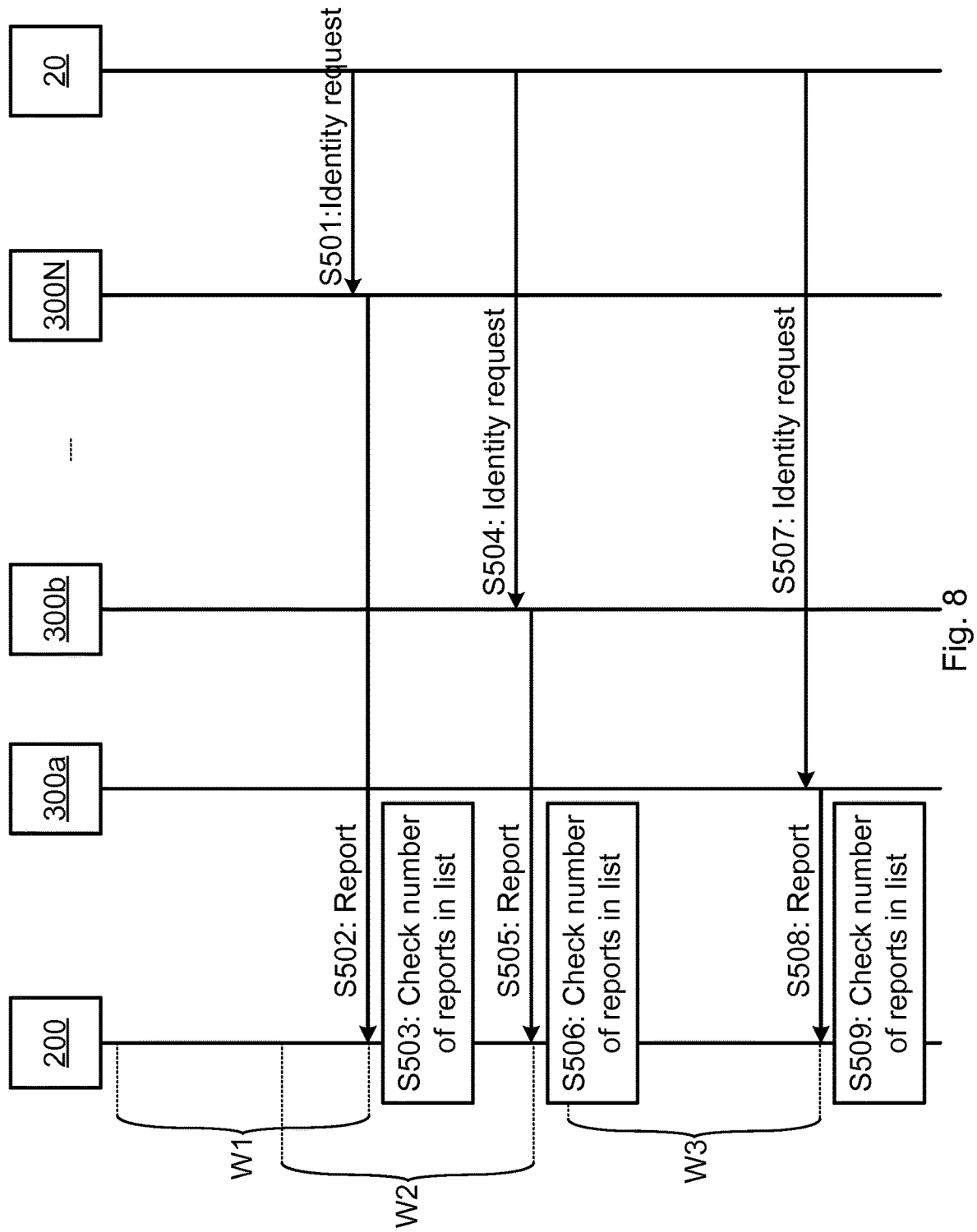
FIG. 8 is a signalling diagram according to an embodiment.

Reference is made to FIG. 8 illustrating a method for identifying and reporting a fraudulent base station 20 as performed by the analyser device 200 and radio devices 300a:300N based on at least some of the above embodiments.

S501: Fraudulent base station 20 sends an identity request message for a long-term identifier. The identity request message is received by radio device 300N.

S502: Radio device 300N provides a report of the identity request message to analyser device 200 and also attaches its own ID, and optionally a timestamp indicating when the identity request message was received, to the report.

S503: Analyser device 200 writes the received report and a timestamp indicating when the report was received (and/or when in time the identity request message was received by the related radio device 300a:300N) to a list. Analyser device 200 removes from the list any previous report received from radio device 300N pertaining to the same reported base station. Since no previous reports have been received, no reports are removed. The analyser device 200 checks if there, for the same base station, are k>1 reports in the list and if these k reports all have timestamp not older than the threshold time value given by the time window W1. Since only one report has been received, this condition is not fulfilled. Base station 20 is therefore not yet identified as fraudulent.

S504: Fraudulent base station 20 sends another identity request message for a long-term identifier. The identity request message is received by radio device 300b.

S505: Radio device 300b provides a report of the identity request message to analyser device 200 and also attaches its own ID, and optionally a timestamp indicating when the identity request message was received, to the report.

S506: Analyser device 200 writes the received report and a timestamp indicating when the report was received (and/or when in time the identity request message was received by the related radio device 300a:300N) to the list. The analyser device 200 removes from the list any previous report received from radio device 300b. Since no previous reports have been received from radio device 300b, no reports are removed. The analyser device 200 checks if there, for the same base station, are k>1 reports and if these k reports all have timestamp not older than the threshold time value given by the time window W2. Since there are two reports for one and the same base station in the list (i.e., k=2) and these reports were both received within the time window W2, this condition is fulfilled. Base station 20 is therefore identified as fraudulent. A notification might therefore be issued by the analyser device 200.

S507: Fraudulent base station 20 sends yet another identity request message for a long-term identifier. The identity request message is received by radio device 300a.

S508: Radio device 300a provides a report of the identity request message to analyser device 200 and also attaches its own ID, and optionally a timestamp indicating when the identity request message was received, to the report.

S506: Analyser device 200 writes the received report and a timestamp indicating when the report was received (and/or when in time the identity request message was received by the related radio device 300a:300N) to the list. Analyser device 200 removes from the list any previous report received from radio device 300a. Since no previous reports have been received from radio device 300a, no reports are removed. The analyser device 200 checks if there are more than k>1 reports and if these k reports all have timestamp not older than the threshold time value given by the time window W3. There are now three reports in the list, but the reports from radio device 300b and radio device 300N were both received outside the time window W3, this condition is no longer fulfilled. Base station 20 is therefore in this context not identified as fraudulent.

In this embodiment analyser device 200 thus in a list keeps only the most recent report received for each radio device 300a:300N. Also, older reports are regularly removed from the list according to a sliding time window (as given by W1, W2, W3). In this respect, W1, W2, and W3 are thus examples of the threshold time duration. Whenever there are k>1 reports in the list, this is an indication that a fraudulent base station has been identified.

Although the condition that there are k>1 reports in the list has been used in some of the embodiments and examples above, there could also be other conditions. For example, a general condition is that it could be required that there are k>z reports in the list, where z>1. The higher the value of z, the higher the chance that the base station 20 indeed is fraudulent. However, increasing the value of z also increases the risk of missing to identify a base station 20 as fraudulent. In general terms, the value of z could be set so as to be dependent on the total number N of radio devices 300a:300N; the higher the value of N, the higher is the value that z could be set to. Of course, z should never be set to a value higher than N.

Figure 9:
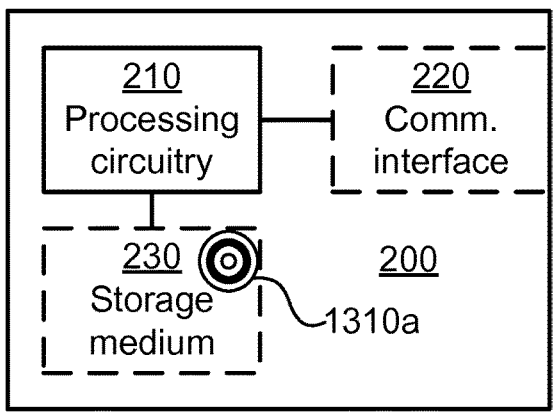
FIG. 9 is a schematic diagram showing functional units of an analyser device according to an embodiment.

FIG. 9 schematically illustrates, in terms of a number of functional units, the components of an analyser device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310a (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the analyser device 200 to perform a set of operations, or steps, as disclosed above. For example, the storage medium 230 may store the set of operations, and the processing circuitry 210 may be configured to retrieve the set of operations from the storage medium 230 to cause the analyser device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The analyser device 200 may further comprise a communications interface 220 for communications with other entities, node, functions, and devices in the communication network of FIG. 1. As such the communications interface 220 may comprise one or more transmitters and receivers, comprising analogue and digital components.

The processing circuitry 210 controls the general operation of the analyser device 200 e.g. by sending data and control signals to the communications interface 220 and the storage medium 230, by receiving data and reports from the communications interface 220, and by retrieving data and instructions from the storage medium 230. Other components, as well as the related functionality, of the analyser device 200 are omitted in order not to obscure the concepts presented herein.

Figure 10:
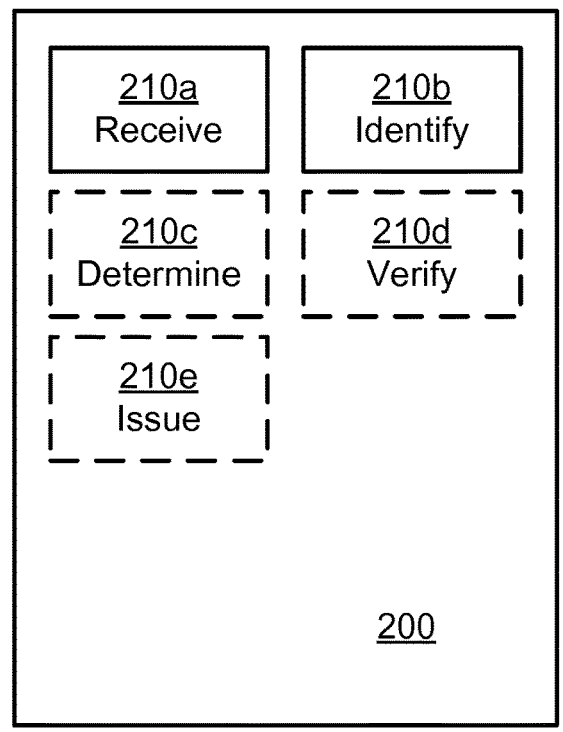
FIG. 10 is a schematic diagram showing functional modules of an analyser device according to an embodiment.

FIG. 10 schematically illustrates, in terms of a number of functional modules, the components of an analyser device 200 according to an embodiment. The analyser device 200 of FIG. 10 comprises a number of functional modules; a receive module 210a configured to perform step S102, and an identify module 210b configured to perform step S104. The analyser device 200 of FIG. 10 may further comprise a number of optional functional modules, such as any of a determine module 210c configured to perform step S106, a verify module 210*d* configured to perform step S108, and an issue module 210*e* configured to perform step S110. In general terms, each functional module 210*a*-210*e* may be implemented in hardware or in software. Preferably, one or more or all functional modules 210*a*-210*e* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*e* and to execute these instructions, thereby performing any steps of the analyser device 200 as disclosed herein.

The analyser device 200 may be provided as a standalone device or as a part of at least one further device. For example, the analyser device 200 may be provided in a node of a radio access network or in a node of a core network. Alternatively, functionality of the analyser device 200 may be distributed between at least two devices, or nodes.

These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. Thus, a first portion of the instructions performed by the analyser device 200 may be executed in a first device, and a second portion of the instructions performed by the analyser device 200 may be executed in a second device; the herein disclosed embodiments are not limited to any particular number of devices on which the instructions performed by the analyser device 200 may be executed. Hence, the methods according to the herein disclosed embodiments are suitable to be performed by an analyser device 200 residing in a cloud computational environment. Therefore, although a single processing circuitry 210 is illustrated in FIG. 9 the processing circuitry 210 may be distributed among a plurality of devices, or nodes. The same applies to the functional modules 210*a*-210*e* of FIG. 10 and the computer program 1320*a* of FIG. 13.

Figure 11:
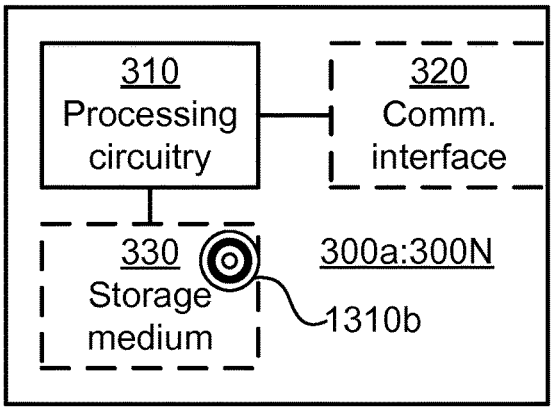
FIG. 11 is a schematic diagram showing functional units of a radio device according to an embodiment.

FIG. 11 schematically illustrates, in terms of a number of functional units, the components of a radio device 300*a*:300N according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310*b* (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the radio device 300*a*:300N to perform a set of operations, or steps, as disclosed above. For example, the storage medium 330 may store the set of operations, and the processing circuitry 310 may be configured to retrieve the set of operations from the storage medium 330 to cause the radio device 300*a*:300N to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The radio device 300*a*:300N may further comprise a communications interface 320 for communications with other entities, node, functions, and devices in the communication network of FIG. 1. As such the communications interface 320 may comprise one or more transmitters and receivers, comprising analogue and digital components.

The processing circuitry 310 controls the general operation of the radio device 300*a*:300N e.g. by sending data and control signals to the communications interface 320 and the storage medium 330, by receiving data and reports from the communications interface 320, and by retrieving data and instructions from the storage medium 330. Other components, as well as the related functionality, of the radio device 300*a*:300N are omitted in order not to obscure the concepts presented herein.

Figure 12:
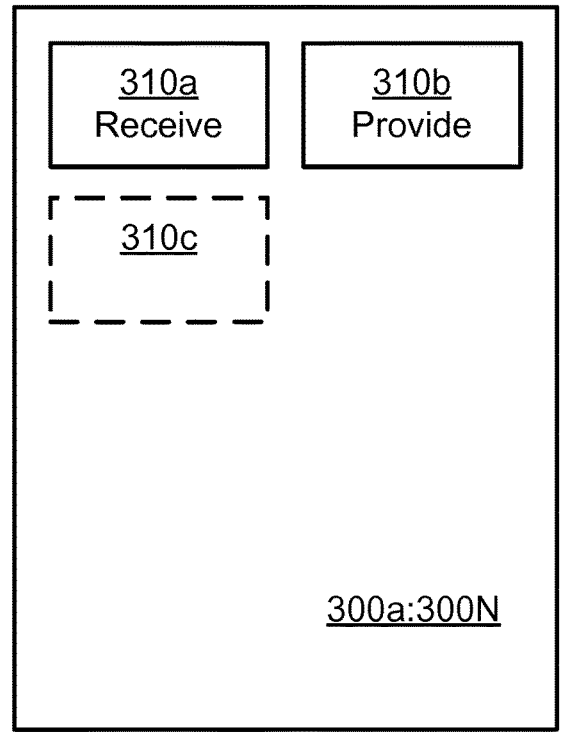
FIG. 12 is a schematic diagram showing functional modules of a radio device according to an embodiment.

FIG. 12 schematically illustrates, in terms of a number of functional modules, the components of a radio device 300*a*:300N according to an embodiment. The radio device 300*a*:300N of FIG. 12 comprises a number of functional modules; a receive module 310*a* configured to perform step S202, and a provide module 310*b* configured to perform step S204. The radio device 300*a*:300N of FIG. 12 may further comprise a number of optional functional modules, as represented by functional module 310*c*. In general terms, each functional module 310*a*-310*c* may be implemented in hardware or in software. Preferably, one or more or all functional modules 310*a*-310*c* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*c* and to execute these instructions, thereby performing any steps of the radio device 300*a*:300N as disclosed herein.

Figure 13:
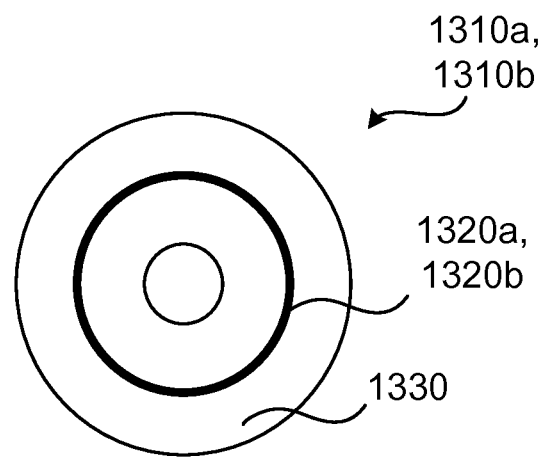
FIG. 13 shows one example of a computer program product comprising computer readable means according to an embodiment.

FIG. 13 shows one example of a computer program product 1310*a*, 1310*b* comprising computer readable means 1330. On this computer readable means 1330, a computer program 1320*a* can be stored, which computer program 1320*a* can cause the processing circuitry 210 and thereto operatively coupled entities and devices, such as the communications interface 220 and the storage medium 230, to execute methods according to embodiments described herein. The computer program 1320*a* and/or computer program product 1310*a* may thus provide means for performing any steps of the analyser device 200 as herein disclosed. On this computer readable means 1330, a computer program 1320*b* can be stored, which computer program 1320*b* can cause the processing circuitry 310 and thereto operatively coupled entities and devices, such as the communications interface 320 and the storage medium 330, to execute methods according to embodiments described herein. The computer program 1320*b* and/or computer program product 1310*b* may thus provide means for performing any steps of the radio device 300*a*:300N as herein disclosed.

In the example of FIG. 13, the computer program product 1310*a*, 1310*b* is illustrated as an optical disc, such as a CD (compact disc) or a DVD (digital versatile disc) or a Blu-Ray disc. The computer program product 1310*a*, 1310*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320*a*, 1320*b* is here schematically shown as a track on the depicted optical disk, the computer program 1320a, 1320b can be stored in any way which is suitable for the computer program product 1310a, 1310b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A system for identifying a fraudulent base station, the system comprising an analyser device and at least two radio devices, configured to:
provide a report, from any of the at least two radio devices and to the analyser device upon said any of the at least two radio devices having received from a base station an identity request message for a long-term identifier of said any of the at least two radio devices, of the identity request message; and
identify, by the analyser device, the base station as fraudulent when reports of the same base station as received from at least two different ones of the at least two radio devices are received within a threshold time duration with respect to each other.

2. The system according to claim 1, further being configured to:
issue, by the analyser device, a notification of the thus identified fraudulent base station.

3. The system according to claim 2, wherein the notification is an alert message that is by the analyser device sent to a network management entity.

4. The system according to claim 2, wherein the notification only is issued when the analyser device has received reports separated from each other at most by the threshold time duration from at least k radio devices, where k>1 is an integer.

5. The system according to claim 1, further being configured to:
determine, by the analyser device, a certainty level based on how many reports separated from each other at most by the threshold time duration have been received and how many at least two radio devices are operatively connected to the analyser device.

6. The system according to claim 5, wherein the notification only is issued when the certainty level is above a certainty threshold value.

7. The system according to claim 5, wherein the certainty level further is based on network statistics obtained by the analyser device.

8. The system according to claim 1, further being configured to:
verify, by the analyser device querying a database and before the notification is issued, that the base station is not a registered base station.

9. The system according to claim 1, wherein the at least two radio devices are positioned relative each other to receive signals from same base station.

10. The system according to claim 1, wherein the report comprises a Cell ID of the base station having sent the identity request message.

11. The system according to claim 1, wherein the long-term identifier is an international mobile subscriber identity (IMSI).

12. The system according to claim 1, wherein the at least two radio devices collectively are configured to be served by at least two different mobile network operators.

13. The system according to claim 1, wherein the identity request message is received during an attach procedure, a Tracking Area Update (TAU) procedure, or a Location Area Update (LAU) procedure.

14. The system according to claim 1, wherein the identity request message is received without said any of the at least two radio devices having experienced network lock out.

15. The system according to claim 1, wherein the identity request message is received upon said any of the at least two radio devices already having performed initial registration since its radio modem lastly was switched on.

16. The system according to claim 1, wherein each of the at least two radio devices is operatively connected to the analyser device over a wired connection or a wireless connection.

17. The system according to claim 1, wherein the analyser device and the at least two radio devices are integrated, collocated, or provided, within one and the same physical entity defining the system.

18. The system according to claim 17, wherein the system is configured to be mounted on a fixed location.

19. The system according to claim 17, wherein the system is configured to be movable.

20. An analyser device for identifying a fraudulent base station, the analyser device comprising processing circuitry, the processing circuitry being configured to cause the analyser device to:
receive a report, from any of at least two radio devices upon said any of the at least two radio devices having received from a base station an identity request message for a long-term identifier of said any of the at least two radio devices, of the identity request message; and
identify the base station as fraudulent when reports of the same base station as received from two different ones of the at least two radio devices are received within a threshold time duration with respect to each other.

21. A method for identifying a fraudulent base station, the method being performed by an analyser device, the method comprising:
receiving a report, from any of at least two radio devices upon said any of the at least two radio devices having received from a base station an identity request message for a long-term identifier of said any of the at least two radio devices, of the identity request message; and
identifying the base station as fraudulent when reports of the same base station as received from two different ones of the at least two radio devices are received within a threshold time duration with respect to each other.

22. A method for reporting a fraudulent base station, the method being performed by a radio device, the method comprising:
receiving, from a base station, an identity request message for a long-term identifier of the radio device; and
providing a report of the identity request message to an analyser device upon the radio device having received the identity request message.

\* \* \* \* \*